June 21, 1949.
J. G. HOOP
2,473,527
APPARATUS FOR PRODUCTION OF
HEAT TREATING ATMOSPHERES
Filed Oct. 12, 1945
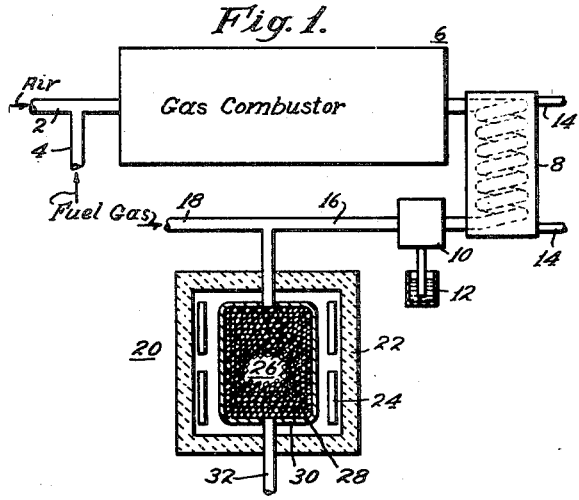
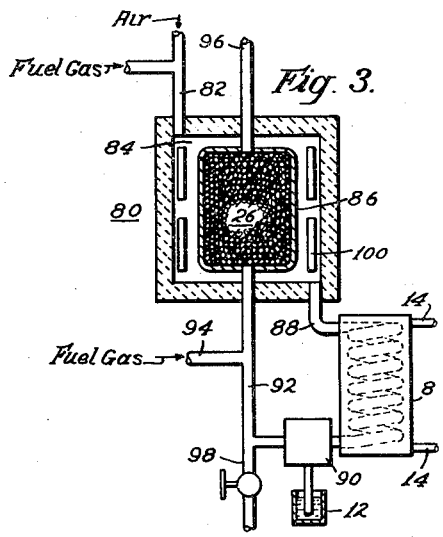
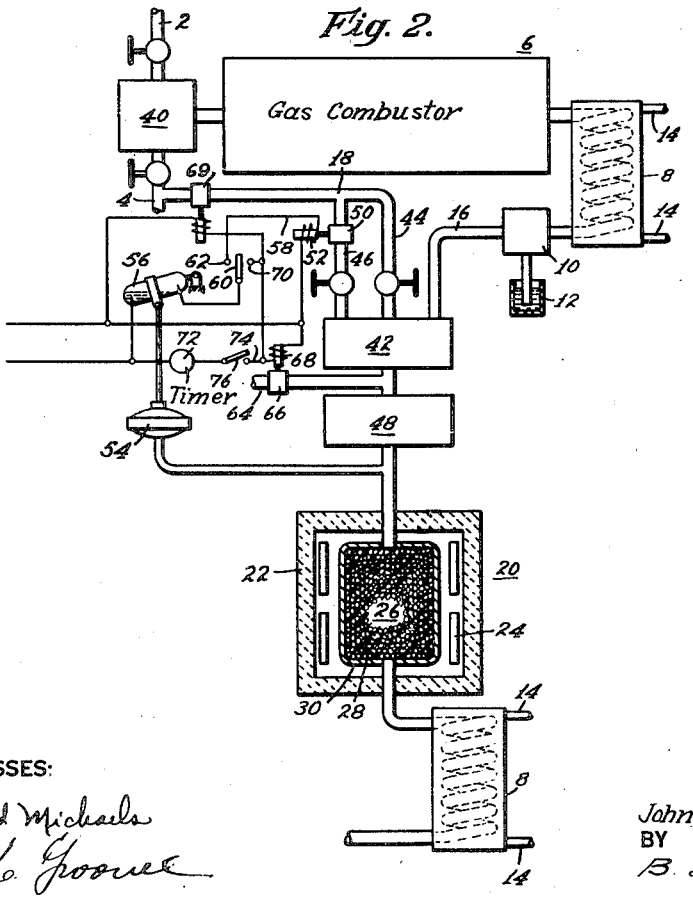
WITNESSES:
Edward Michaels
INVENTOR
John G. Hoop.
BY
B. L. Zangwill
ATTORNEY Patented June 21, 1949

2,473,527

UNITED STATES PATENT OFFICE 2,473,527

APPARATUS FOR PRODUCTION OF HEAT-TREATING ATMOSPHERES

John G. Hoop, Pittsburgh, Pa., assignor to Westinghouse Electric Corporation, East Pittsburgh, Pa., a corporation of Pennsylvania Application October 12, 1945, Serial No. 622,051

1 Claim. (Cl. 23—281)

It is known that a fuel-gas and air or other gas which is oxidizing with respect to the first, can be created for obtaining a product-gas which is useful, directly or after further processing, as a special atmosphere for enveloping metals, especially steel, undergoing heat treatment. A useful atmosphere consists of significant parts of carbon monoxide, hydrogen, and nitrogen, as little carbon dioxide and water (in vapor form) as practical, and sometimes small amounts of methane or other hydrocarbon gases. The final composition of such a special atmosphere will depend on each particular application, but in many instances the ingredients of the atmosphere may vary through a wide range without harm. Systems for producing such special atmospheres are disclosed in the copending application of C. E. Peck and myself, Serial No. 447,682, filed June 19, 1942, and my copending application, Serial No. 564,541, filed November 21, 1944. My invention relates to this field of activity.

In accordance with my invention, I combine a number of known elements into a system which can be continuously operated without attention for continously providing a product-gas, such as described, from fuel-gas and air; the system being such that the fuel-gas is utilized to the best advantage.

Other objects, features, and innovations of my invention, in addition to the foregoing and those mentioned in the said applications, will be obtainable from the following description and accompanying drawing. In the drawing, in which like reference numerals represent like parts:

Figure 1 is a schematic view, partly in section, for illustrating the basic principles of my invention;

Fig. 2 is a view similar to Fig. 1 having added elements for providing a more practical system; and Fig. 3 is a schematic view, partly in section, of a modified form of my invention in a simplified form.

Referring to Fig. 1, air and a fuel-gas, flowing through pipes 2 and 4 respectively, are delivered in controllable proportions to a gas-generator or gas-combustor 6 where the fuel-gas is burned. Preferably, sufficient air is supplied to cause the carbon in the fuel-gas to be oxidized to carbon dioxide as completely as possible within practical limits. The gas-combustor 6 may be of any suitable construction, of which several are known. My patent, No. 2,331,583, of November 12, 1940, describes a form which can be used. Descriptive bulletin No. 28–800, effective June 14, 1944, and entitled "Exogas atmosphere generators," published and distributed by the Westinghouse Electric & Manufacturing Company (now the Westinghouse Electric Corporation) mentions another form of such a gas-combustor.

The products of combustion, which I designate for convenience and distinction as combusted gas, flows from the gas-combustor 6 through any suitable dehydrating means, represented for simplicity as a condenser 8 and a water separator 10 having a water trap 12. The condenser is kept cool by cold water passing through it through inlet and outlet pipes 14. Water in the combusted gas is condensed and removed as a liquid through water trap 12. The resulting gas, which I refer to as treated combusted gas, passes into a conduit 16.

In my invention, this treated combusted gas is reacted with fuel-gas supplied through a pipe 18. The fuel-gas may be the same as that supplied to the gas-combustor 6 or a different fuel-gas. The reaction is caused to take place in a gas-generator 20 which includes insulating walls 22 and a heating chamber including heating means 24, shown as electrical resistors. The gas-generator also comprises a reaction-chamber 26 comprising a porous catalyst filling 28 inside a metallice retort 30. The heating means 24, when operative, heats the reaction-chamber and its catalyst filling. The catalyst filling preferably comprises a multitude of small round nickel balls of uniform size. Anywhere from $\frac{1}{4}$ to 1" in diameter is satisfactory, but the smaller sizes are more desirable. However, I am not limited to such a catalyst. Descriptive bulletin No. 28–810 entitled "Endogas atmosphere generators," effective June, 1944, and distributed by the Westinghouse Electric & Manufacturing Company (now Westinghouse Electrical Corporation) has further information concerning such generators, many of which are now in use.

The treated combusted gas contains considerable proportions of carbon dioxide, and is oxidizing with respect to the fuel-gas which includes a hydrocarbon; or, conversely, the fuel-gas is reducing with respect to the treated combusted gas. The gases are fed to the reaction-chamber 26 through the conduit 16 and pipe 18. Product-gas from the reaction-chamber 26 is taken from the gas-generator 20 through an outlet including a discharge pipe 32.

The operations of the bare system disclosed may be explained by assuming ideal theoretical conditions. For example only, assume that the fuel-gas is a pure hydrocarbon, say 100% methane, and that this methane is completely burned in the gas-combustor 6 with atmospheric air consisting of one-fifth oxygen and four-fifths nitrogen. In this reaction one part of methane reacts with ten parts of air to produce a combusted gas consisting of one part of carbon dioxide, eight parts of nitrogen, and two parts of water, in accordance with the following:

(1) $CH_4 + 2O_2 + 8N_2 \rightarrow CO_2 + 8N_2 + 2H_2O$

The combusted gas is delivered to the dehydrating means where the $H_2O$ is removed. The treated combusted gas is reacted in the gas-generator 20 with additional fuel-gas, also assumed to be 100% methane, in proportions for just about reducing the carbon dioxide in the treated combusted gas to carbon monoxide. In this reaction, one part of methane reacts with one part of carbon dioxide and eight parts of nitrogen to produce two parts carbon monoxide, two parts hydrogen and eight parts nitrogen in accordance with the following:

(2) $CH_4 + CO_2 + 8N_2 \rightarrow 2CO + 2H_2 + 8N_2$

From these two equations it may be observed that, under the theoretical conditions, two volumes of the methane yield twelve volumes of a special atmosphere which is free from water and carbon dioxide.

If the methane were reacted directly with air to produce a gas free from water and carbon dioxide, the theoretical reaction would be (3) $2CH_4 + O_2 + 4N_2 \rightarrow 2CO + 4H_2 + 4N_2$ From this equation, it is apparent that two volumes of methane result in only ten volumes of a special atmosphere.

Fig. 2 is a system similar to that in Fig. 1 but with some control equipment added to illustrate the building up of a practical application of my invention for obtaining a system which does not require continuous attention by a skilled operator. In the system of Fig. 2, a gas proportioning and mixing means 40, including a by-pass around a constant displacement pump, mixes the air and fuel-gas that is delivered to the gas-combustor 6, in proper proportions. A second gas proportioning and mixing device 42 is provided for receiving and mixing in desired proportions the treated combusted gas from the conduit 16 and the fuel-gas fed through two valve-controlled branches 44 and 46 from the pipe 18. The mixture is delivered to a constant-flow mechanism 48 from which the mixture is delivered to the reaction-chamber 26 at a constant supply rate.

The branch 46 also includes a normally open spring-biased valve 50 which can be operated to closed position by energizing a solenoid 52. The solenoid 52 is controlled by a pressure-responsive device 54 which operates a normally open switch 56. When the pressure at the inlet of the gas-generator is above a predetermined value, the switch 56 is closed so that the solenoid 52 is energized through a circuit 58 if a manually operable switch arm of a single pole double throw switch 60 engages contact 62. Energization of the solenoid 52 closes the valve 50, so that the proportion of fuel-gas in the mixture flowing into the reaction-chamber 26 is lowered. When the pressure at the inlet side of the gas-generator decreases below a predetermined value, the switch 56 is moved to open position, deenergizing the solenoid 52 so that the valve 50 opens and restores the proportion of fuel-gas in the mixture.

Bypassing the gas-proportioning and mixing device 42 is an air-supply pipe 64 for air under pressure. This pipe is normally closed by an electrically-operated spring-biased valve 66 which is opened when a solenoid 68 is energized, for adding a relatively large amount of pure air. At the same time that the solenoid 68 is energized, a normally-open electrically-operated valve 69 in the fuel-gas supply pipe 18, is energized for shutting off the fuel-gas supply. If the switch arm of the switch 60 is moved to contact 70, the pressure-responsive device 54 will control the additional air-supply, making the supply mixture leaner every time the valve 66 in the air-supply pipe 64 is opened and the valve 69 in the fuel-gas supply pipe 18 is closed. The additional air-supply can also be controlled by a timer 72 in a circuit 74 having a normally open switch 76.

The gas-generator 20 can be operated with a relatively richer supply-mixture, that is one having slightly less oxygen than is required to oxidize, to carbon monoxide, the carbon-content of the mixture while producing a satisfactory product-gas. Such a condition causes free carbon to be deposited in the pores of the catalyst filling 28 of the reaction chamber 26. The carbon deposit increases with time, increasing the gas pressure at the inlet of the gas-generator; but before the carbon deposit has increased enough to impair the operation of the gas-generator, the pressure-responsive device 56 operates and the supply-mixture is made leaner with more oxygen than is necessary to oxidze the carbon content of the mixture to carbon monoxide. This extra proportion of oxygen reacts with deposited carbon in the catalyst filling, and the gas pressure at the inlet of the gas-generator decreases until the pressure-responsive device 54 responds to restore the richer supply mixture. The richer mixture is restored after deposited carbon has been consumed to some extent, but preferably before all the carbon has been consumed. This richer mixture again causes a build-up of free carbon in the gas-generator. By successively alternately supplying relatively rich and lean gases to the gas-generator, under proper controls, a suitable product-gas can be continuously obtained for use as, or for, a special atmosphere.

By controlling the switches 76 and 60, the latter including a position in which neither of the contacts 62 and 70 are engaged by its pole or switch arm, various gas-supplies may be provided for the gas-generator for controlling the carbon deposit and carbon conditions in it.

Fig. 3 illustrates a somewhat modified form of my invention in which the heat of combustion in the first stage of the system is utilized. In this system, a gas-generator 80 is provided having an inlet pipe 82 for a mixture of fuel-gas and air for combustion inside a heating chamber 84 of the gas-generator 80. The heat produced heats a retort 86 within the heating chamber which is filled with small nickel balls or other suitable catalyst. The combusted gas is withdrawn from the heating chamber 84 through outlet 88 which includes a water separator 90 that discharges treated combusted gas into a conduit 92. A mixture of the treated combusted gas and a fuel-gas from a supply pipe 94 is directed into the heated retort 86. Product-gas is withdrawn through an outlet pipe 96. Generally, the heat produced by the combustion of the air and fuel-gas in the heating chamber 84 is insufficient for satisfactorily reducing the treated amount of combusted gas that is withdrawn from the heating chamber. Consequently, if desired a certain amount may be bled off before or after the water separator. A valve-controlled bleed pipe 98 has been shown for this purpose. However, I prefer to use an electrical heating means 100 to augment the heating of the retort 76 so that substantially all of the treated combusted gas can be reacted with fuel-gas in a single equipment.

While I have described my invention in forms which I believe are now preferred, it is obvious that practical application may take various forms and that many equivalents may be used, applied and substituted. For example, although the device 56 has been described as a "pressure responsive device," the term, pressure responsive, as used in the claim, is not necessarily limited to a device actuated solely by gas pressure but is intended to apply to any device which reflects the gas pressure.

I claim as my invention:

A system for producing a special atmosphere, comprising, in combination, a gas-combustor having an inlet and outlet, pipe-means connected to said inlet for conveying to said gas-combustor a fuel-gas, comprising a hydrocarbon, and an oxidizing gas, moisture-separating means, a conduit connected to said outlet and extending to said moisture-separating means, a gas-generator including a closed reaction-chamber having a gas-inlet and a gas-outlet in its otherwise solid walls, and having a porous non-carbonaceous catalyst filling, said gas-generator including means for heating said catalyst filling, a gas-conduit system comprising pipe line connections from said moisture-separating means to said gas-inlet, said gas-conduit system including a branched inlet pipe-means for a supply of carbonaceous fuel-gas to be added to the treated combusted gas from said moisture-separating means, a pressure responsive device comprising a pipe connected to said gas-conduit system, a valve in said branched inlet pipe-means, an interconnecting means extending between said pressure responsive device and said valve operatively interconnecting them so that the device causes operation of the valve, and a product-gas outlet from said gas-outlet of said reaction chamber.

JOHN G. HOOP.

REFERENCES CITED

The following references are of record in the file of this patent:

UNITED STATES PATENTS

| Number | Name | Date |
| --- | --- | --- |
| 1,954,991 | Garner et al. | Apr. 17, 1934 |
| 1,984,380 | Odell | Dec. 18, 1934 |
| 2,180,376 | Vaughan | Nov. 21, 1939 |
| 2,278,204 | Lewis | Mar. 31, 1942 |